April 4, 1950

L. J. BOWNE 2,502,820

PRIVATE BRANCH EXCHANGE SYSTEM WITH MEANS FOR PREVENTING INTERFERENCE FROM UNBALANCE CONDITIONS

Filed July 8, 1946

3 Sheets-Sheet 1

INVENTOR
L. J. BOWNE
BY
A. G. Kingman
ATTORNEY

April 4, 1950 L. J. BOWNE 2,502,820

PRIVATE BRANCH EXCHANGE SYSTEM WITH MEANS FOR PREVENTING INTERFERENCE FROM UNBALANCE CONDITIONS

Filed July 8, 1946 3 Sheets-Sheet 2

INVENTOR
L. J. BOWNE
BY
[signature]
ATTORNEY

April 4, 1950 L. J. BOWNE 2,502,820
PRIVATE BRANCH EXCHANGE SYSTEM WITH
MEANS FOR PREVENTING INTERFERENCE
FROM UNBALANCE CONDITIONS
Filed July 8, 1946 3 Sheets-Sheet 3

INVENTOR
L. J. BOWNE
BY
[signature]
ATTORNEY

Patented Apr. 4, 1950

2,502,820

UNITED STATES PATENT OFFICE 2,502,820

PRIVATE BRANCH EXCHANGE SYSTEM WITH MEANS FOR PREVENTING INTERFERENCE FROM UNBALANCE CONDITIONS

Langford J. Bowne, Howard Beach, N. Y., assignor to Bell Telephone Laboratories, Incorporated, New York, N. Y., a corporation of New York Application July 8, 1946, Serial No. 681,818

3 Claims. (Cl. 179—51)

This invention relates to telephone systems and more particularly to improvements in cord circuits for use in private branch exchange switchboards.

A feature of the invention resides in the provision of a repeating coil coupling between a calling station line and a trunk to an automatic exchange, at the conclusion of dialing by the attendant prior to the disconnection of the attendant's dial and telephone set from the cord, whereby unbalance of longitudinal currents flowing in the lines are prevented from interfering with speech transmission.

Another feature resides in effecting an increase in the signaling range of trunk circuits between a branch exchange and central office by reducing the resistance of the holding bridge connected across the central office trunk during dialing and before the attendant's telephone and dial circuit is disconnected.

Another feature resides in a circuit arrangement which functions, immediately following the restoration of the dial to its normal condition, to reduce the probability of false operation of the central office equipment at that stage of the dialing operation.

Other advantages of the improved arrangement will be apparent from the following description when read in connection with the accompanying drawing in which.

Figure 3:
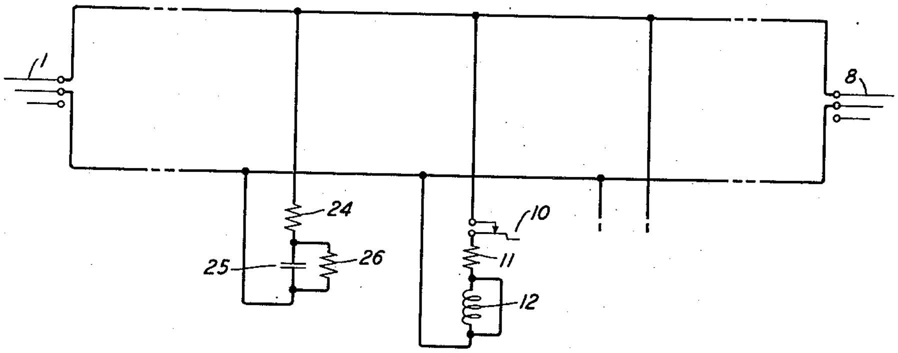
Figure 4:
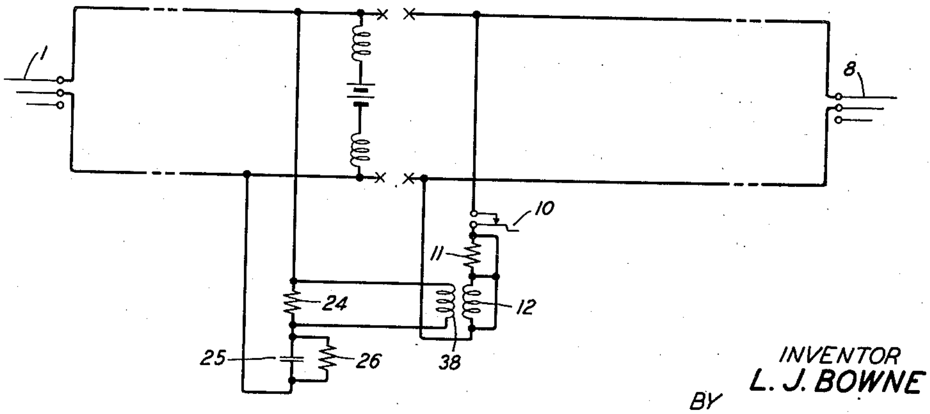
Figure 5:
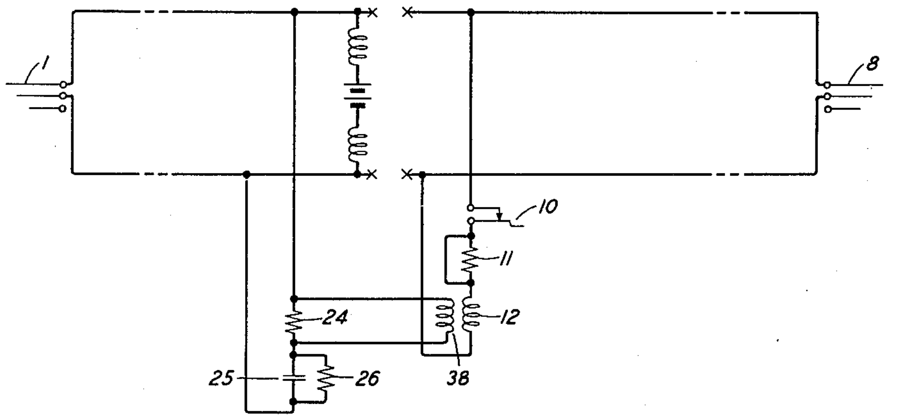
Figure 6:
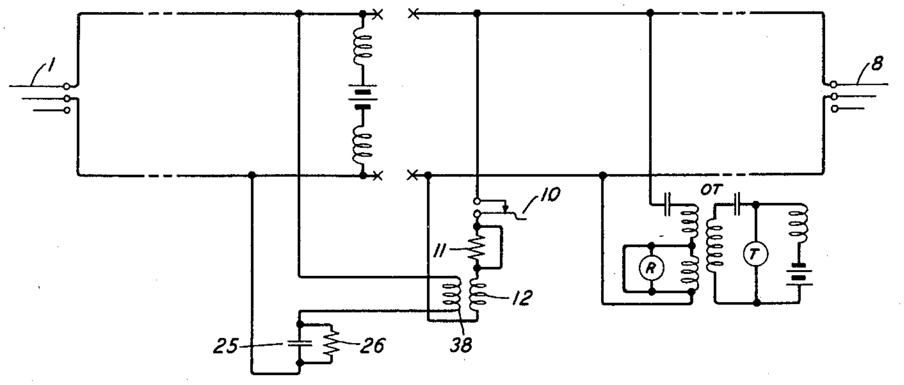

Fig. 3 the condition immediately following the movement of the dial off-normal;

Fig. 4 the condition shortly thereafter following a slight delay in the sequential operation of certain relays in the circuit;

Fig. 5 the momentary condition immediately following the return of the dial to normal;

Fig. 6 the condition existing after another short delay interval; and

Figure 7:
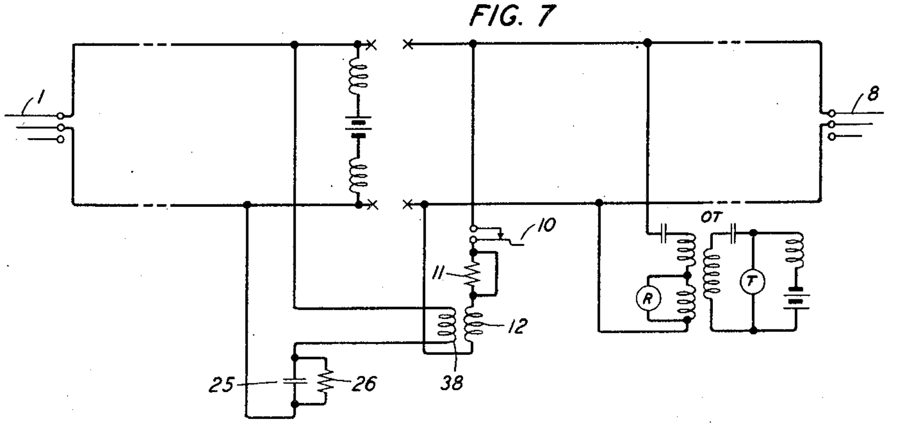

Fig. 7 the condition shortly thereafter following a further delay interval which figure schematically shows the speech transmission path through the cord until the talk and dial key is released.

Following is a description of the operation of the circuit arrangement incorporating the present invention.

Figure 1:
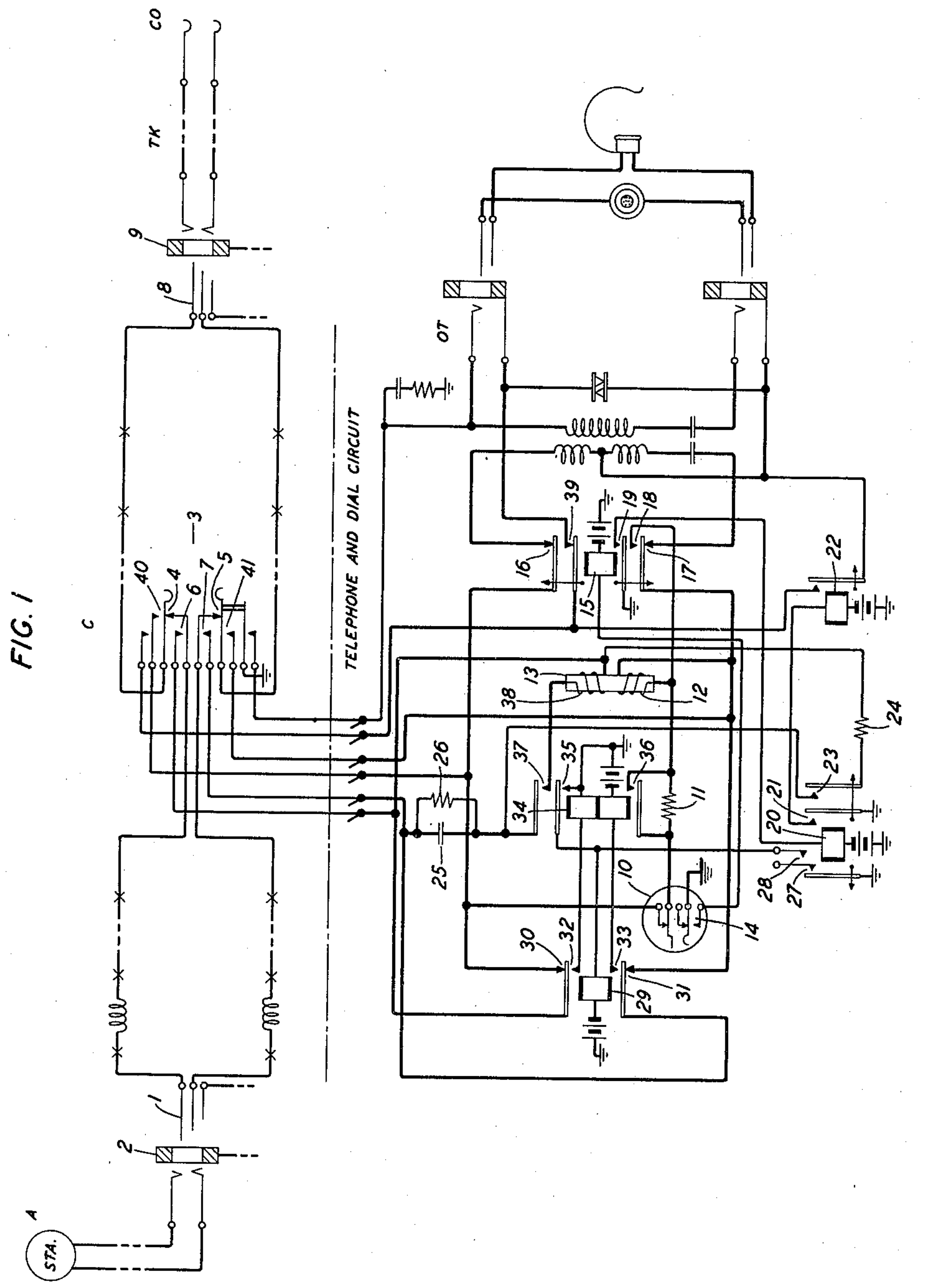
Fig. 1 represents a private branch exchange cord circuit and associated telephone and dial circuits for interconnecting a station line and a trunk line to an automatic exchange.

Referring to Fig. 1 it will be assumed a station A calls and the attendant or operator inserts the station plug 1 of the cord circuit C in the jack 2 of the station line and thereafter operates the talk and dial key 3, thereby opening the key contacts 4 and 5 and closing contacts 6, 7, 40 and 41, thus looping the tip and ring conductors of the cord through the telephone and dial circuit associated therewith which enables the attendant to talk with the calling station.

Figure 2:
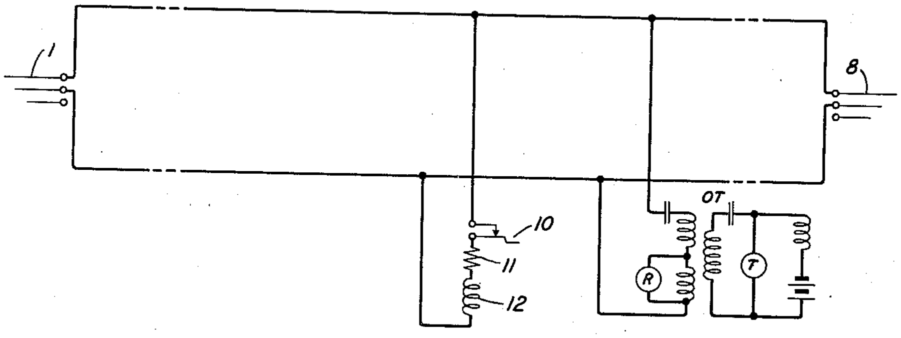
Fig. 2 represents schematically the circuit condition immediately following operation of the talk and dial key.

The condition of the circuit at this time is schematically shown in Fig. 2, i. e., the tip and ring conductors of the cord are continuous between the two plugs to which are connected the attendant's telephone set OT and a bridge serially comprising the contacts of dial 10, a resistance 11, and one winding 12 of a two-winding inductance 13.

If the call is to be extended to a central office over a trunk TK which terminates in an automatic switch the attendant inserts the trunk plug 8 into jack 9 of the trunk and moves the dial 10 off-normal thus closing the off-normal contacts 14 of the dial and operating relay 15 in an obvious circuit.

Relay 15 in operating opens its contacts 16 and 17 thus disconnecting the attendant's telephone circuit from its connection to the cord. Operation of relay 15 also closes its contacts 18 thus short-circuiting the inductive winding 12 in series with the dial bridge. Contacts 19 also close to operate relay 20 which has a slow release characteristic. Operation of relay 20 closes its contacts 21 to operate relay 22 which partially closes a short-circuit for the receiver of the attendant's telephone set which will be closed when the dial restores to normal and relay 15 releases, as later referred to.

Operation of relay 20 also closes its contacts 23 thus establishing a second bridge across the cord serially comprising a relatively low resistance 24, of the general order of 50 ohms, and a condenser 25, shunted by a relatively high resistance 26 of the general order of 100,000 ohms.

The condition of the circuit at this time with contacts 21 and 23 of relay 20 closed is schematically shown by Fig. 3, i. e., the operator's telephone set is disconnected from the cord, a dial bridge is connected across the cord including resistance 11, which in practice is of the general order of 400 ohms, (inductance 12 being short circuited), and a second bridge is also connected across the cord comprising low resistance 24 in series with condenser 25, which condenser is shunted by a high resistance 26.

Relay 20 in operating also completes, over its sequentially closed contacts 27 and 28, a circuit for relay 29 which is delayed in operation until after the foregoing bridge, including resistance 24 and condenser 25 is established across the cord.

When contacts 27 and 28 of relay 20 are both closed, relay 29 operates and opens its contacts 30, 31, thus interrupting the cord conductors between the interconnected lines at a point intermediate the foregoing described bridges, and immediately closes inner contacts 32 and 33 thereby connecting battery and ground to the cord conductor connected to the station line, in series with the windings of relay 34.

Assuming the telephone is "off the hook" at the station, relay 34 operates and closes its contacts 35 thus completing a circuit to hold relay 29 operated as long as the receiver remains off the hook at the station.

Operation of relay 34 also closes its contacts 36 to short-circuit resistance 11 in the dial bridge which is now connected across the trunk end of the cord and also closes its contacts 37 to connect the upper winding 38 of inductance 13 in shunt to the low resistance 24 in the bridge across the station end of the cord.

Fig. 4 schematically represents the condition of the circuit following the operation of relay 34.

The circuit is now in condition to transmit dial pulses and consequently while the dial returns to normal, the trunk is alternately opened and closed in accordance with the dial setting.

When the dial finally restores, the off-normal contacts 14 are opened and relay 15, which is slow-to-release finally opens its contacts 18 and 19 and recloses its contacts 16, 17 and 39 which latter contact was opened, when relay 15 operated, to open the receiver circuit of the attendant's telephone in addition to the disconnection of the entire telephone set from the cord by the opening of the contacts 16 and 17.

Reclosure of contacts 16 and 17 reconnects the telephone circuit to the trunk end of the cord circuit and closure of contacts 39 completes a short-circuit for the receiver which short-circuit was prepared at the time relay 22 operated.

When contacts 18 opened the short-circuit around winding 12 of the inductance 13 was removed and the opening of contacts 19 opens the energizing circuit for slow-to-release relay 20 which, after a short delay, disconnects the low resistance 24 previously connected in shunt to the winding 38 of the inductance 13. Release of relay 20 also opens the energizing circuit for relay 22 which relay is also slow to release.

Release of relay 20 also opens its contacts 27 and 28 but this has no effect as relay 29, which was initially energized over these contacts, is now locked in an operated condition over contacts 35 of relay 34.

During the shunt interval following the opening of contacts 18 of relay 15 and prior to the opening of contacts 23 of relay 20 the dial bridge across the trunk end of the cord presents a low but effective impedance, as viewed from the central office, to reduce the possibility of a false pulse, i. e., false release of the line relay at the central office, when the dial returns to normal. This impedance bridge comprises the contacts of dial 10, in series with winding 12 of inductance 13, which winding is inductively coupled to winding 38 of the same inductance which at this time is shunted by the relatively low resistance 24 which effectively reduces the impedance of winding 12.

The foregoing described condition is schematically shown in Fig. 5, but exists only momentarily for when relay 20 releases and opens its contacts 23 resistance 24 is removed from its shunt connection to winding 38 thus increasing the impedance of winding 12 in the trunk bridge to a value which more nearly matches the impedance of the trunk looking toward the central office. The condition then existing is shown in Fig. 6, i. e., the short-circuit around winding 12 of the inductance 13 in the dial bridge has been removed, the attendant's telephone is reconnected to the cord, the receiver is short-circuited and the bridge across the station end of the cord serially comprises the windings 38 of inductance 13 and condenser 25 shunted by the high resistance 26, to the exclusion of low resistance 24 which previously had been connected in shunt to winding 38.

When slow-release 22, now deenergized, opens its contacts, the short-circuit around the attendant's receiver is removed and the condition of the circuit is shown in Fig. 7 which is in the final circuit condition pending the release of the talk and dial key. At this time the speech transmission path between the station and the central office is through the inductance 13 which acts as a repeating coil.

Upon subsequent operations of the dial to transmit further digits of the code, the circuit functions as previously described except that relay 34 remains operated, under control of the calling station, which in turn holds relay 29 operated. When the talk and dial key is released the relays all return to normal.

What is claimed is:

1. In a telephone system, a switchboard, a station line terminating thereat, a trunk line also terminating thereat and extending to an automatic switch, a cord circuit at said switchboard interconnecting said lines, a dial, a two-winding repeating coil, a first resistance, a condenser shunted by a high resistance, a low resistance, and a source of talking potential, means for connecting said operator's telephone to the cord and for establishing a first bridge across said cord serially comprising said dial, said first resistance, and a first winding of said repeating coil, means thereafter responsive to an off-normal condition of said dial for disconnecting said operator's telephone, short-circuiting said first repeating coil winding, connecting said shunted condenser in series with said low resistance in a second bridge across said cord, subsequently opening said cord circuit between said first and second bridges, connecting said talking potential across the station end of said cord, connecting the second winding of said repeating coil in shunt to said low resistance, and short-circuiting the first resistance and responsive to the return of the dial to normal to effect a delayed reconnection of said operator's telephone to the trunk end of said cord, to remove the short circuit from the first winding of said repeating coil, complete a short circuit around the receiver of said operator's telephone set, which circuit was prepared responsive to initiation of said off-normal condition of the dial, and subsequently, after a second delay, to open the low resistance in shunt to the second repeating coil winding and, after a still further delay, to remove the short circuit from the receiver of the operator's telephone set.

2. In a telephone system, a telephone connection including a trunk line terminating in an automatic switch, a trunk cord connected to said trunk, a dial associated with said trunk cord for controlling said automatic switch, and switching means included in said cord and responsive to return of the dial to normal following its operation for momentarily establishing a low impedance inductive bridge across said trunk cord and thereafter increasing the impedance of said bridge to a relatively high value.

3. In a telephone switchboard, a station line terminating thereat, a trunk line also terminating thereat and extending to an automatic switch, a cord circuit having one end thereof connected to said station line and the other to said trunk line, a dial in bridge of the trunk end of said cord, a two winding repeating coil, a low resistance, means controlled by an off-normal condition of said dial for opening said cord intermediate its two ends and connecting one winding of said repeating coil in shunt to said low resistance in bridge of the station end of said cord, and means responsive to the return of said dial to normal for connecting the other winding of said repeating coil in series with said dial bridge and after a momentary delay for removing said low resistance from its shunt connection to the first winding of the repeating coil.

LANGFORD J. BOWNE.

REFERENCES CITED

The following references are of record in the file of this patent:

UNITED STATES PATENTS

| Number | Name | Date |
|---|---|---|
| 1,515,360 | Powell | Nov. 11, 1924 |
| 1,653,790 | Temple | Dec. 27, 1927 |
| 1,917,403 | Stich | July 11, 1933 |
| 2,139,249 | Welch | Dec. 6, 1938 |